United States Patent [19]

Seaman

[11] 4,333,618

[45] Jun. 8, 1982

[54] APPARATUS FOR REDUCING TAPE TENSION VARIATIONS IN A PERIPHERAL BELT DRIVE TAPE TRANSPORT SYSTEM

[75] Inventor: William E. Seaman, Woodside, Calif.

[73] Assignee: Newell Research Corporation, Saratoga, Calif.

[21] Appl. No.: 162,598

[22] Filed: Jun. 24, 1980

[51] Int. Cl.³ .......................... G03B 1/04; G11B 15/32
[52] U.S. Cl. ..................................... 242/192; 242/199
[58] Field of Search ....................... 242/192, 197–204, 242/208–210, 75.2; 226/195; 360/96, 132

[56] References Cited

U.S. PATENT DOCUMENTS

| | | | |
|---|---|---|---|
| 3,405,857 | 10/1968 | Albrecht | 226/195 |
| 3,831,882 | 8/1974 | Fitterer et al. | 242/199 |
| 3,979,079 | 9/1976 | Ohashi et al. | 242/75.2 |
| 4,065,075 | 12/1977 | Holcomb | 242/199 |
| 4,172,569 | 10/1979 | Newell | 242/192 |
| 4,185,795 | 1/1980 | Walraven | 242/209 |
| 4,221,348 | 9/1980 | Moeller | 242/192 |

Primary Examiner—Leonard D. Christian

[57] ABSTRACT

A tape cartridge in which tape is driven from a tape-supply hub onto a tape take-up hub by an endless drive-belt loop engaging the tape-wound hub peripheries. Tape tension variation due to the differences in the radius to the drive-belt center line and the radius to the tape center line is reduced by introducing fixed friction posts in the tape path. One post is located so as to be in constant contact with the tape as it spools off of the supply roll. Another post is located so as to be in constant contact with the tape as it winds onto the take-up roll.

7 Claims, 3 Drawing Figures

APPARATUS FOR REDUCING TAPE TENSION VARIATIONS IN A PERIPHERAL BELT DRIVE TAPE TRANSPORT SYSTEM

DESCRIPTION

Technical Field

The present invention relates to tape transport systems, and more particularly to apparatus for reducing tension variations in tape transport systems which utilize a peripheral drive belt which engages the periphery of tapes wound upon supply and take-up hubs, in order to transfer tape from one hub to the other hub while maintaining a tension in the tape.

A tape transport system with a peripheral belt drive is disclosed in U.S. Pat. No. 4,172,569 to Chester W. Newell. The transport system disclosed has a tape supply hub and a take-up hub, the tape being drawn from the supply hub over a first turn-around idler, a transducer head, over a second turn-around idler, and onto the take-up hub. An endless drive belt loop, having a thickness which is approximately equal to or less than that of the tape thickness, engages the periphery of the tape wound upon the supply hub and the tape wound upon the take-up hub. The drive belt drives the tape-wound hub to thereby transfer tape from one hub to the other hub and causes a tension to be established on the portion of the tape extending between these two hubs. The first and second turn-around idlers are positioned so as to support the span of tape across the transducer head and guide the tape over the head as the tape is transferred from one of the hubs to the other one of the hubs.

The belt drive is driven by a rotating driving roller which causes the belt to drive the tape hubs, to tension the tape, and to move the tape between the two hubs. The required velocity differential between the take-up and supply hub periphery necessary to maintain tape tension is established by underdriving the rear drive belt idlers through a tensioning belt coupled to the driving roller. This is accomplished by driving the tape drive belt on a larger diameter sheave on the drive roller than the sheave used for the tensioning belt. A substantial reduction in the net tension variation in the drive belt resulting from changes in the curved path due to tape transfer between the hubs is accomplished by mounting the hubs and tape guides in particular locations. The particular locations are chosen for producing approximately equal and opposite path length change effects for the first and second portions of the drive belt as the tape length transfers between the hubs.

The peripheral belt guide system provides a means of developing a velocity differential at the drive belt radial center line. By using a relatively stiff tape drive belt, with a fixed geometric placement of the elements of the tape transport system, an almost total self-compensation in the drive belt path length change effect occurring by virtue of the changing diameters of the tape wound hub as the tape is transferred from one hub to the other is accomplished. However, the resulting velocity at the tape center lines on each of the hubs at the region where the drive belt engages with the tape wound hub is reduced at the radius ratios of belt center lines to tape center lines. The velocity differential of belt and tape center lines will be equal only when the supply roll and the take-up roll radii are equal, which occurs at the mid point of tape passage. This tension variation problem is defined in a paper entitled "An Improved ANSI-Compatible Magnetic Tape Cartridge" by Chester W. Newell, published in the IEE Transactions on Magnetics, Vol. Mag.-14, No. 4, July 1978. (See equation 26 thereof.) For practical tape hub and tape pack radii, tape and belt thicknesses and elasticity, and a practical usable geometry, the tape tension variation is typically in the order of 25% of nominal tape tension, or higher. Reducing this tape tension variation will reduce the amount of tension necessary to maintain a working tension for contact with the transducing head, thus decreasing head and tape wear and increasing tape life.

Disclosure of Invention

In a tape periphery drive transport system having a tape supply hub and a tape take-up hub, wherein the tape is drawn from the supply hub over a first turn-around element, such as an idler, past a transducing head, over a second turn-around element, such as an idler, and onto the take-up hub, tape tension variations due to the differences in the radius to the belt center line and the radius to the tape center line is reduced by introducing a fixed guide friction post located in the tape path between the turn-around idler and the tape supply roll. The fixed friction guidepost is located so as to be in constant contact with the tape as it spools off of the supply roll, the tape describing a minimum angle of wrap around the post when a minimum amount of tape is wound upon the hub, and a maximum angle of wrap around the post when a maximum amount of tape is wound upon the hub. The minimum angle is an angle greater than zero degrees, which is sufficient to prevent the frictional drag from falling to zero. A similar geometry is provided with respect to the tape takeup roll. As tape in the head span slips over the fixed post, a tension gradient will build up in such a manner that the tension before the post will be increased after contact with the post, the increase being determined by such parameters as the coefficient of friction between the tape and the post and the angle of wrap of tape around the post. As tape spools off of the supply roll the angle of wrap decreases on the supply guidepost. Conversely, as tape spools onto the takeup roll the angle of wrap increases around the takeup guidepost. At the beginning of tape passage where the takeup roll radius is less than the supply roll radius, the tension in the head span will be increased. Similarly, during the second half of tape passage where the supply roll radius is less than the takeup roll radius, the tension in the head span will be decreased. Since this increase/decrease effect is in the opposite direction to the tension variation caused by the belt radial center line to tape radial center line radius difference the introduction of the tape guideposts provides a cancelling effect.

DESCRIPTION

Figure 1:
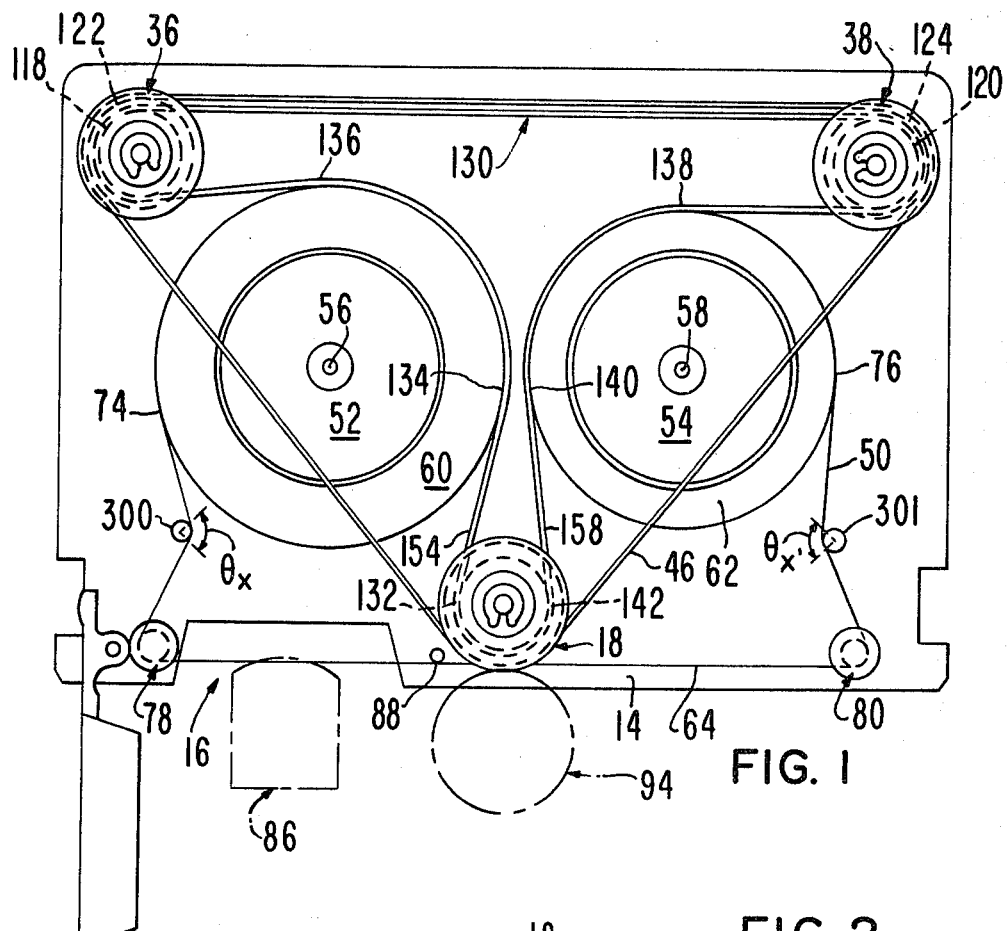
FIG. 1 is a top plan view of the tape transport system of the present invention embodied in a magnetic tape cartridge.

A tape transport system with peripheral belt drive employing a belt which is relatively stiff compared to the tape stiffness is more fully described in U.S. Pat. No. 4,172,569 to Chester W. Newell, which issued on Oct. 30, 1979, and is assigned to Newell Research Corporation. For ease of understanding reference numerals in the present application are the same as those in the Newell patent when used for describing elements of the invention which are the same.

Figure 2:
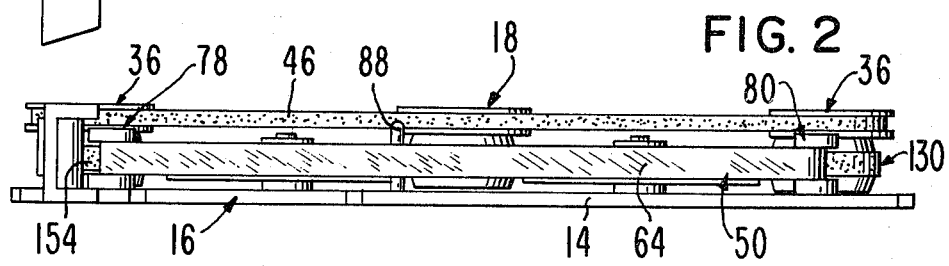
FIG. 2 is a front elevation of the cartridge shown in FIG. 1.

Referring now to FIGS. 1 and 2 a tape supply hub 52 and a tape take-up hub 54 are rotatably mounted on a lower plate 14 of a tape cartridge by means of a pair of shafts 56, 58. A length of magnetic recording tape 50 has one end portion or roll 60 wound on the first hub 52, and an opposite end portion or roll 62 wound on the hub 64. An intermediate portion 64 extends between the hubs from a peripheral point 74 on the tape roll 60 to a peripheral point 76 on tape roll 62.

The intermediate portion of tape 64 is trained over a pair of turn-around idlers or tape guides 78, 80 which are rotatably fixed to the lower plate 14. The turn-around idlers provide a substantially frictionless guide for the tape. The turn-around idlers 78, 80 provide proper alignment of the tape head-span within the head station aperture 16 in order to maintain proper contact with a magnetic recording head 86 when the catridge is engaged in a record-playback apparatus. A further tape support idler or post 88 fixed to the lower plate 14 prevents the tape from touching the belt drive member 18 while the head 86 is in contact with the recording tape.

The drive member 18 is rotatably mounted on a shaft to the lower plate 14 in such a position that it will engage with a drive capstan 94 which is part of the record/playback apparatus.

The drive member 18 has a first level of one diameter and a second level of a larger diameter which offer different mechanical advantages (See FIG. 2). A drive belt 130 engages the smaller diameter level and a tensioning belt 46 engages the larger diameter level.

A pair of rotary belt guide members, or rear idlers, 36, 38, are rotatably mounted on a pair of shafts fixed to the lower plate 14. These idlers each have first levels 118, 120, and second levels 122, 124, of different diameters for affording different mechanical advantages.

The endless-loop drive belt 130 is trained about the first level of the drive member 18, and the first levels 118, 120, of the rear idlers 36, 38.

The endless-loop tensioning belt 46 is trained about the second level of the drive member 18 and the second levels 122, 124, of the rear idlers 36, 38.

The drive member 18 is rotated by the capstan 94 in a clockwise direction. The drive belt 130 engages the tape pack 60 between peripheral points 134 and 136 so as to define a wrap angle about the tape pack 60. The drive belt 130 engages the tape pack 62 between the points 138 and 140 so as to also define a wrap angle.

The endless tensioning belt 46 provides the means to cause a differential in tension between the first portion 154 of the drive belt 130 and the second portion 158 of the drive belt 130 by effectively underdriving and causing an opposing torque on the rear idlers 36, 38 as the result of the difference in diameter of the second level with respect to the first level on the drive pulley and rear idlers around which the respective drive belt and tensioning belt are wrapped. This results in the maintenence of a tension in the tape 50.

As more fully described in the above identified Newell patent, the position of the drive member 181 and the idlers 36, 38 are chosen so that as tape is transferred between the first and second hubs the net tension variation in the drive belt portions 154, 158 is kept to a minimum. This is accomplished by choosing the fixed locations which will produce approximately equals and opposite drive belt length change effects for the first and second drive belt portions as the tape is transferred between the hubs.

This method provides a means of developing a velocity differential at the drive belt radial center line of the drive belt portions 154, 158. However, the resulting velocity at the tape center lines in the respective engagement regions at the tape pack is less than that at the belt center line. This is because there is a difference between the radius from the center of the hub to the belt center line and from the center of the hub to the tape center line, depending upon the respective thicknesses of the belt and the magnetic recording tape. The velocity differentials of belt and tape center lines will be equal only when the supply and take-up roll pack radii are equal, or at the midpoint of tape passage between the take-up and supply hubs.

Figure 3:
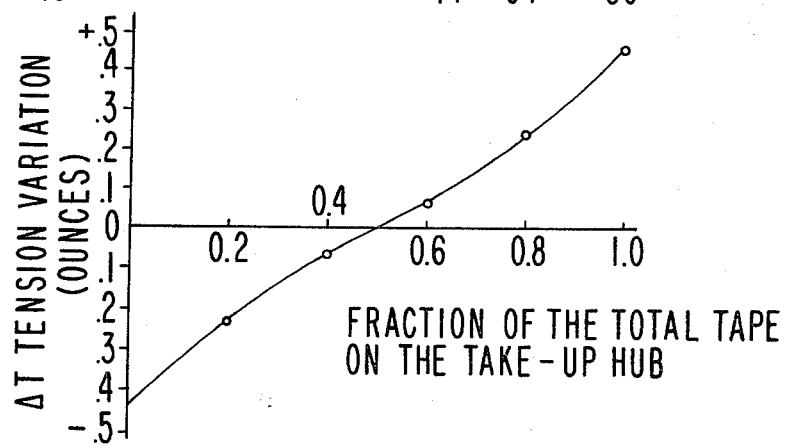
FIG. 3 is a graph plotting tension variation in ounces as a function of the fraction of the total tape wound upon the take-up hub for a typical tape drive belt.

The variations of tape tension as a function of the fraction of tape on the take-up hub is shown typically in the graph of FIG. 3. This plot was obtained by driving 300 feet of one-fourth inch width mylar tape of one mil thickness, driven by a polyimide belt 0.105 inches wide of three mil thickness in a ANSI (American National Standard Institute) standard number X3B5/7518 tape cartridge with a tape hub radius of 0.838 inches. With an average tension of 2.5 ounces, the graph of FIG. 3 shows that a tension variation factor of up to 35% exists.

Referring again to FIG. 1, an additional friction post 300, is located in the tape path between the turn-around idler 78 and the supply roll. The fixed friction post is located so as to be in constant contact with the tape as it spools off of the hub 52. The tape describes a minimum angle of wrap round the post when a minimum amount of tape is wound upon the hub, and a maximum angle of wrap around the post when a maximum amount of tape is wound upon the hub. The minimum angle is any working angle greater than zero degrees, sufficient to prevent the frictional drag from dropping to zero.

A similar post 301 is positioned between the take-up turn-around idler 80 and the take-up roll 62.

As tape with tension T in the head span passes over the fixed guidepost, a tension gradient of $\Delta T_x$ will build up in such a manner that the tension (T) before the post will be increased after contact with the post to $T_x$, in accordance with the following equations:

$$\frac{T_x}{T} = e^{\mu \theta_x} \tag{1}$$

or $$A_x = \frac{T}{T_x} = \frac{1}{e^{\mu \theta_x}}$$

where $\mu$ is the coefficient of friction between tape and posts $\theta_x$ is the wrap angle corresponding to any particular value of tape supply roll radius x $A_x$ is the tension "amplification factor" of the post upon the head span tension T.

For the corresponding values of take-up roll radius x' on the "upstream" side of the system, the before/after tension relationships will similarly be $$\frac{T}{T_{x'}} = e^{\mu\theta x'} \quad (2)$$

or $$A_{x'} = \frac{T}{T_{x'}} = e^{\mu\theta x'}$$

The net "amplification factor" of the upstream and downstream posts, 300,301, upon tape tension in the head span will thus be $$A = A_x \cdot A_{x'} = e^{\mu(\theta x' - \theta x)} \quad (3)$$

By inspection, it will be seen that at the beginning of tape passage where take-up radius is less than supply:

$$\theta_x < \theta_{x'}$$

and $$A < 1$$

i.e. the tension in the head span will be *increased*. Similarly, during second half of tape passage $$\theta_x > \theta_{x'}$$

$$A < 1$$

and the tension in the head span will be *decreased*.

It will be understood that this increase/decrease effect as tape passes from the supply roll to the takeup roll is in the opposite direction of the tension variation shown in FIG. 3 and thus provides a cancellation effect.

EXAMPLE

In the particular embodiment of the ¼-inch ANSI-compatible cartridge (FIGS. 1 and 2), posts of convenient size and location provide values of $\theta_x$ and $\theta_{x'}$ as shown in FIG. 1. (The values of $\theta_{x'}$ will be "mirror" images of $\theta_x$.)

The tension to be cancelled at the point where 20% of tape is on takeup hub is −0.232 oz.

With a mid-point tape tension of 2½ ounces, the tension in the head span at the above values of x and x' is thus 2.268 ounces for a tension increase ratio of 2.268/2.500=0.907. To cancel this, the posts should provide an amplification factor of $$A = \frac{1}{0.907} = 1.102$$

From equation 3:

$$A = e^{\mu(\theta x' - \theta x)} = 1.102$$

Substituting the values for $\theta_{x'}$ and $\theta_x$ at the 20% point and solving, the desired coefficient of friction for complete cancellation would be:

$$\mu = 0.263$$

For other percentages:

| % on Takeup | $\theta_x$ | $\theta_{x'}$ | Desired A | Desired $\mu$ |
|---|---|---|---|---|
| 0 | 0.9064 | 1.5716 | 1.2107 | 0.2874 |
| 20 | 1.0540 | 1.4240 | 1.1023 | 0.2632 |
| 40 | 1.1788 | 1.2992 | 1.0301 | 0.2465 |
| 60 | 1.2992 | 1.1788 | 0.9716 | 0.2395 |
| 80 | 1.4240 | 1.0540 | 0.9151 | 0.2397 |
| 100 | 1.5716 | 0.9064 | 0.8518 | 0.2411 |

For "best fit" cancellation, the values are averaged:

$$\mu_{ave.} = 0.253$$

The measured coefficient of friction between 5/16″ diameter polished steel rod and Maxell 35-180B magnetic tape, for example, is $$\mu = 0.26$$

Using 5/16″ polished steel posts, the resultant corrected tensions thus become:

| % on Takeup | Tens. Before Correction | Actual A | Tens. After Correction |
|---|---|---|---|
| 0 | 2.065 | 1.1888 | 2.455 |
| 20 | 2.268 | 1.1010 | 2.497 |
| 40 | 2.427 | 1.0318 | 2.504 |
| 60 | 2.573 | 0.9692 | 2.494 |
| 80 | 2.732 | 0.9083 | 2.481 |
| 100 | 2.935 | 0.8412 | 2.469 |

Tension spread ΔT before correction=0.870 oz.=35% of average tension of 2½ oz.

Tension spread ΔT correction=0.049 oz.=2% of average tension of 2½ oz.

In the practical example given, tension variation was reduced from 35% to 2%.

While the invention has been particularly shown and described with reference to a preferred embodiment thereof, it will be understood by those skilled in the art that various changes in form and details may be made therein without departing from the spirit and scope of the invention.

I claim:

1. In a tape transport system having a tape supply hub and a tape takeup hub, wherein tape is drawn from the supply hub over a first turn-around element, past a transducing head station, over a second turn-around element, and onto the takeup hub;

a length of tape having one end portion wound about the tape supply hub, an opposite end portion wound about the tape takeup hub, and an intermediate portion of tape extending between the hubs;

an endless drive belt loop having a stiffness which is at least approximately equal to that of the tape stiffness, said drive belt engaging the periphery of tape wound upon the supply hub and the takeup hub for driving the tape-wound hubs to thereby transfer tape from one hub to the other hub and for establishing a tension on the intermediate portion of tape;

said first and second tape guide turn-around elements being positioned so as to support a head-span of tape to thereby guide the intermediate portion of tape past the transducing head station as the tape is transferred from one of the hubs to the other one of the hubs, the improvement comprising:

a first fixed friction post located in said tape path, between said turn-around element and said supply roll, said first post being located so as to be in constant contact with the tape as it spools off of said supply hub, the tape describing a minimum angle of wrap around said post when a minimum amount of tape is wound upon said hub, and a maximum angle of wrap around said post when a maximum amount of tape is wound upon said hub, said minimum angle being an angle greater than zero degrees, sufficient to prevent the frictional drag between the tape and post surfaces from falling to zero;

and a second fixed friction post located in said tape path, between said second turn-around idler and said takeup roll, said second post being located so as to be in constant contact with the tape as it spools onto said takeup hub, the tape describing a minimum angle of wrap around said post when a minimum amount of tape is wound upon said hub, and a maximum angle of wrap around said post when a maximum amount of tape is wound upon said hub, said minimum angle being an angle greater than zero degrees, sufficient to prevent the frictional drag between the tape and post surfaces from falling to zero.

2. The combination in accordance with claim 1 wherein said first and second posts each comprise a polished rod with a coefficient of friction ($\mu$) between tape and post which is within the range 0.2 to 0.3.

3. The combination in accordance with claim 1 wherein said minimum and maximum angles of wrap around said first and second posts is within the range of 5° to 90°.

4. The combination in accordance with claim 1 wherein said first and second posts are of such a diameter, have such a coefficient of friction ($\mu$) and are so positioned, that as tape passes from the supply hub to the take-up hub, a first angle of wrap ($\theta_x$) of tape is described at said first post, and a second angle of wrap ($\theta_{x'}$) of tape is described at said second post, to thereby provide a net tension amplification factor (A) of said first and second posts upon tape tension in said head span of tape, in accordance with the following equation:

$$A = e^{\mu(\theta_{x'} - \theta_x)},$$

whereby such tension amplification factor (A) substantially complements the tension variation factor during tape transfer from supply-to take-up roll.

5. The combination in accordance with claim 4 wherein said first and second posts each comprise a polished rod with a coefficient of friction ($\mu$) between tape and post which is within the range 0.2 to 0.3.

6. The combination in accordance with claim 4 wherein $\theta_x$ and $\theta_{x'}$ are within the range 5° minimum to 90° maximum.

7. The combination in accordance with claim 4 wherein said first and second posts each comprise a polished rod with a coefficient of friction ($\mu$) between tape and posts which is within the range 0.2 to 0.3, and wherein $\theta_x$ and $\theta_{x'}$ are within the range 5° minimum to 90° maximum.

* * * * *